Brown & Burleigh,
Steam Cut-Off.
No. 2,754. Reissued Aug. 27, 1867.
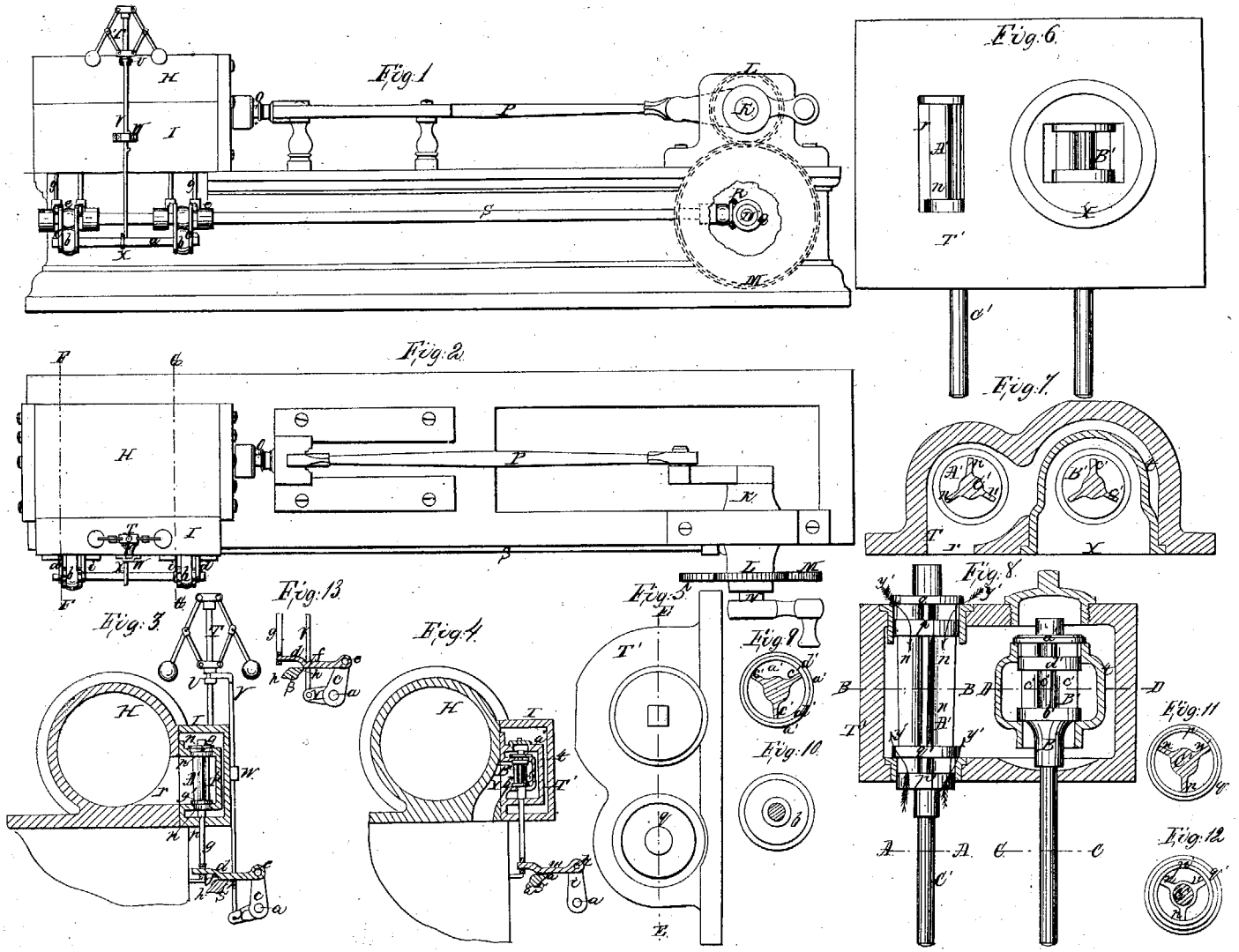
N. PETERS, PHOTO-LITHOGRAPHER, WASHINGTON, D. C.

United States Patent Office.

THE PUTNAM MACHINE COMPANY, OF FITCHBURG, MASSACHUSETTS, ASSIGNEES OF CHARLES H. BROWN AND CHARLES BURLEIGH.

*Letters Patent No.* 14,125, *dated January* 15, 1856; *reissue No.* 2,754, *dated August* 27, 1867.

IMPROVEMENT IN VALVE-GEAR FOR STEAM ENGINES.

The Schedule referred to in these Letters Patent and making part of the same.

TO ALL WHOM IT MAY CONCERN:

Be it known that CHARLES H. BROWN and CHARLES BURLEIGH, both of Fitchburg, in the county of Worcester, and State of Massachusetts, did invent certain Improvements in Arranging and Operating the Valves of Steam Engines as "Cut-Offs," of which the following is a full, clear, and exact description, reference being had to the accompanying drawings, making part of this specification, in which—

Figure 1 is a side elevation of an engine with the improvements of the said Brown and Burleigh applied thereto.

Figure 2 is a plan of the same.

Figure 3, a section through the steam-valve upon the line F F of fig. 2.

Figure 4, a section through the exhaust-valve upon the line G G of fig. 2.

Figure 5 is a plan of the valves.

Figure 6, a rear view of the same.

Figure 7, a horizontal section upon the line B D of fig. 8.

Figure 8, a vertical section upon the line E E of fig. 5.

Figures 9, 10, 11, and 12 are sections through the valves upon various lines of fig. 8, as indicated on the drawings, the views being taken from beneath.

Figure 13, detail which will be referred to hereafter.

This invention consists in a new and peculiar method of arranging and operating the valves of steam engines, by which the steam may be cut off at any point of the stroke, according to the load upon the engine.

To enable others skilled in the art to understand and use this invention, the manner in which it is carried out will now be described.

In the said drawings, H is the cylinder, I the steam-box, O the piston-rod, P the connecting-rod, K the crank-shaft. The latter carries a cog-wheel, L, which engages with a gear, M, upon a short shaft, N. Q is a bevel-wheel upon the shaft N, which gears with the wheel R upon the shaft S, which latter carries the cams that actuate the steam and exhaust-valves.

The connection between the governor and the apparatus which actuates the valves will now be described.

T is the spindle of the governor upon which slides the collar U in the usual manner. This collar is embraced by the forked arm upon the top of the rod V which slides freely in a vertical direction in the guide W, and is attached at its lower extremity to an arm, X, secured to the shaft *a* which vibrates in the bearings *b* projecting from the framework of the engine. *c* are arms attached to the shaft *a*, and vibrating with it. *d* are bent levers, of the form represented in figs. 3 and 13, which are pivoted to the arms *c* at *e*. The extremities of these levers are allowed to play freely in slots at the lower end of the valve-rods *g*. As now the collar upon the governor-spindle rises and falls, the shaft *a* is caused to vibrate in one direction or the other, and the levers *d* are withdrawn more or less from the slots in the stems of the induction or steam-valves A′, for a purpose which will now be explained. *h* are cams upon opposite sides of the shaft S, and immediately beneath the levers *d*, upon which they impinge as the shaft S revolves, and thus the valves A′ are raised from their seats and steam is admitted to the cylinder. In proportion as the balls of the governor diverge the rod V is raised and the ends of the levers *d* are withdrawn from the slots in the bottom of the valve-stems *g*, thus carrying the shoulders *f* farther from the circles of revolution of the cams *h*. The levers *d* are so arranged with reference to the governor and the cams *h* that when the balls are at their highest point the shoulders *f* are withdrawn, (as in fig. 13,) so that the cams revolve without touching the levers, and the inlet-valves are not opened. When, however, the balls are in any other position the shoulders of the levers *d* lie more or less over the cams *h*, and as the latter revolve the levers are raised and the inlet-valves are kept open for a longer or shorter space of time. The steam is thus cut off sooner or later, in proportion as the balls are more or less distended. The levers *d* are curved upon the under side so that they may be eased down gradually as the cams revolve. It is evident, if the cams which open the valves be allowed to make as many revolutions as the main shaft, that they will revolve one hundred and eighty degrees whilst the piston moves once through the cylinder, and that with such an arrangement the steam could not be made to follow the piston the whole length of the stroke should the load on the engine require it, as the valves could not be kept open during the latter part of the stroke of the piston. It therefore, in such case, becomes necessary to revolve the shaft S a less number of times than the main shaft, in which case more than one cam will be required. If the shaft S revolves half as fast as the main shaft two cams will be necessary, as in the case represented in the accompanying drawings. If the main shaft, revolves three times as fast as the shaft S, the latter will require three cams, and so on.

It will be perceived that by means of the arrangement above described the valves may be made to feel the slightest change of velocity in the governor-balls, while at the same time no work is thrown upon the governor, as even the weight of the rod V and the parts connected therewith may be balanced by a weighted arm projecting from the opposite side of the shaft *a* if in any case it be found desirable. In practice, however, we have not found this to be necessary.

The exhaust-valves B′ are operated similarly to the steam-valves, except that they are allowed to open and close without variation. *i* are arms, similar to the arms *c*, which, in lieu of being attached to the shaft *a*, are stationary, and are secured to its bearings *b*. To the top of these arms are pivoted, at *k*, the levers *m*, which are raised by the cams *o* upon the shaft S. As these arms *i* are stationary, the levers *m* are so formed with reference to the cams *o* that the exhaust-valves shall be held open during the whole passage of the piston, as required.

The construction and arrangement of the valves and steam passages will now be described.

Within the steam-chest I is another box, T′. Upon this secondary box are the upper and lower seats of the steam-valve A′. *n* are wings upon the spindle C′ of this valve, which serve to support the open rings *p p′*, the object of which is to guide the valves in their up-and-down motion. *q q′* are the valve-disks, seen in figs. 3, 5, and 8, upon their seats. The box T′ being entirely surrounded with steam, when the valve A′ is raised the steam passes in through the open rings *p p′*, through the opening *r*, into the cylinder. *a′ b′* are the disks of the exhaust-valves which close the eduction passage, when resting upon their seats, as seen in figs. 4 and 8. *c′* are wings which support the hollow ring *d′* which guides the valve in its motions. The seats of this valve are upon the interior box *t*, seen in figs. 4, 7, and 8, the space within which is in constant communication with the exhaust passage X′, and is entirely shut off from the interior of the box T′, except through the valve B′ when the latter is raised from its seat. It will be seen that the steam and exhaust-valves are all placed one in advance of the other upon one side of the cylinder, by which arrangement they can be operated from the shaft S in a direct and simple manner.

The operation of the valves is as follows: When A′ is raised steam is allowed to enter from the steam-chest into the box T′, and through the passage *r* into the cylinder, as indicated by the arrows *y′*. As the piston commences upon its return stroke, (the valve A′ having been previously closed,) B′ is raised, and the steam passes from the cylinder, through the opening *r*, into the box T′, through the valve B′ into the interior box *t*, thence through the eduction passage X′ into the conductor. This arrangement of valves and steam passages is economical, compact, and of simple construction.

*Claim.*

What the said Putnam Machine Company claims, as the invention of the said CHARLES H. BROWN and CHARLES BURLEIGH, is—

1. We claim the cam-shaft S, when so arranged with reference to the main shaft K of the engine as to revolve at a rate of speed less than that of the said main shaft of the engine, substantially as and for the purpose described.

2. We also claim the within-described arrangement of two or more cams *h* upon the shaft S, and with reference to the induction-valves, substantially as and for the purpose described.

3. The shouldered levers *d* having adjustable fulcra *e*, in combination with a cam or cams, *h*, for operating the valves and varying the point of cut-off, substantially as set forth.

4. Arranging the governor, with reference to the shouldered levers *d*, so that it will control the position of their fulcra *e*, and thereby regulate the velocity of the engine, substantially as described.

5. The manner of arranging the steam and exhaust-valves with relation to the cylinder H and shaft S, substantially as and for the purpose set forth.

PUTNAM MACHINE COMPANY,
By its President, S. W. PUTNAM.

Witnesses:
JAMES M. WOODBURY,
PORTER G. BARTON.